INVENTOR
H. C. OKEAN
BY
Sylvan Sherman
ATTORNEY

United States Patent Office 3,444,485

Patented May 13, 1969

3,444,485

SINGLE ADJUSTMENT, VARIABLE SELECTIVITY-CONSTANT FREQUENCY COAXIAL TRANSMISSION LINE FILTER

Herman C. Okean, Huntington, N.Y., assignor to Bell Telephone Laboratories, Incorporated, Berkeley Heights, N.J., a corporation of New York Filed Mar. 17, 1967, Ser. No. 624,043
Int. Cl. H01p 7/00; H03j 3/22
U.S. Cl. 333—73 9 Claims

ABSTRACT OF THE DISCLOSURE

The invention described is a single-adjustment, variable-selectivity resonator intended for use as a bandpass filter. Each of the family of resonators disclosed utilizes a pair of ganged sections of coaxial transmission line as a variable inductance and a variable capacitance. The sections are adapted such that changing the length of either section correspondingly alters the length of the other section in a manner to produce a continuously variable L–C ratio while maintaining an essentially constant L–C product.

Four specific embodiments are described.

This invention relates to bandpass resonators having a fixed center frequency and continuously variable selectivity.

*Background of the invention*

The performance parameters of synchronously tuned, multiple resonator bandpass filters, and impedance matching networks, are dependent upon the selectivities of the individual resonators comprising the overall network. It would be advantageous, therefore, to be able to continuously vary the selectivity of a resonator without substantially changing the center frequency to which the resonator is tuned. Such a variable resonator could then be calibrated with respect to its selectivity and used in a filter or matching network to provide the final selectivity adjustment required to obtain the desired overall network response.

In United States Patent 3,235,822, issued to B. C. De Loach, Jr. on Feb. 15, 1966, there is disclosed a variable-selectivity filter using rotatable sections of rectangular waveguide. It is the object of the present invention to provide a variable selectivity resonator using coaxial cables.

*Summary of the invention*

In accordance with the invention a single-adjustment, variable-selectivity resonator is obtained using a pair of ganged sections of coaxial transmission line as a variable inductance and a variable capacitance. The sections are adapted such that increasing (or decreasing) the length of either section simultaneously decreases (or increases) the length of the other section in a manner to produce a continuously variable inductance-capacitance ratio (selectivity) while maintaining an essentially constant inductance-capacitance product (frequency).

Various embodiments are described using either series or shunt elements. In all instances, however, changes are made by means of a single adjustment.

These and other objects and advantages, the nature of the present invention, and its various features, will appear more fully upon consideration of the various illustrative embodiments now to be described in detail in connection with the accompanying drawings.

*Detail description*

Figure 1A:
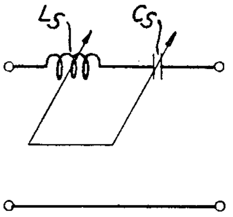
FIGS. 1A and 1B illustrate, schematically, the prototype representation of a general series and a general shunt bandpass resonator.
Figure 1B:
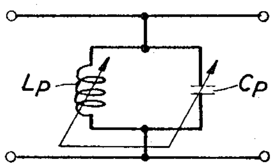

Referring to the drawings, FIGS. 1A and 1B illustrate, schematically, the prototype representation of a general series and a general shunt bandpass resonator comprising, respectively, a series L–C network and a shunt L–C network. The resonant frequency, $f_o$, and the selectivity, Q, for the two resonator types are given by $$f_o=\frac{1}{2\pi\sqrt{L_sC_s}} \text{ and } \frac{1}{2\pi\sqrt{L_pC_p}} \tag{1}$$

$$Q_s=\frac{1}{R}\sqrt{\frac{L_s}{C_s}} \tag{2}$$

and $$Q_p=R\sqrt{\frac{C_p}{L_p}} \tag{3}$$

where

R is the total series resistance of the capacitor and inductor.

Since the inductance and capacitance are to be realized using lengths of transmission line, the total inductance L and capacitance C can be expressed in terms of the inductance $\tilde{L}$ and capacitance $\tilde{C}$ per unit length of transmission line and the adjustable lengths $l_L$ and $l_C$ as:

$$\left.\begin{array}{l} L_s=\tilde{L}_sl_L;\ L_p=\tilde{L}_pl_L \\ C_s=\tilde{C}_sl_C;\ C_p=\tilde{C}_pl_C \end{array}\right\} \tag{4}$$

and

In general, the resonator frequency and selectivity can be separately arrived at by independently adjusting the lengths $l_L$ and $l_C$. However, since an adjustable resonator in accordance with the invention is to be limited to a single adjustment, the following restraints are imposed on $l_L$ and $l_C$.

$$\left.\begin{array}{l} l_L+l_C=l \text{ (a constant)} \\ l_L=\gamma l; \\ l_C=(1-\gamma)l; \\ 0\leq\gamma\leq 1. \end{array}\right\} \tag{5}$$

and where

Thus, by means of a single adjustment which varies the parameter $\gamma$, the two lengths $l_L$ and $l_C$ change simultaneously in a manner to maintain a constant overall length $l$.

By substituting the relationships given by (4) and (5) in (1), (2) and (3), the relevant resonator parameters as a function of $\gamma$, are expressable as:

$$f_o=\frac{f_{oo}}{2\sqrt{\gamma(1-\gamma)}} \tag{6}$$

$$Q_s=Q_{so}\sqrt{\frac{\gamma}{1-\gamma}} \tag{7}$$

and $$Q_p=Q_{po}\sqrt{\frac{1-\gamma}{\gamma}} \tag{8}$$

where $f_{oo}$, $Q_{so}$ and $Q_{po}$ are the mid-band values (i.e., $\gamma=0.5$) given by $$f_{oo}=f_o\Big]_{\gamma=0.5}=\frac{1}{\pi l\sqrt{\tilde{L}_s\tilde{C}_s}} \text{ or } \frac{1}{\pi l\sqrt{\tilde{L}_p\tilde{C}_p}} \quad (9)$$

$$Q_{so}=Q_s\Big]_{\gamma=0.5}=\frac{1}{R}\sqrt{\frac{\tilde{L}_s}{\tilde{C}_s}} \quad (10)$$

and $$Q_{po}=Q_p\Big]_{\gamma=0.5}=R\sqrt{\frac{\tilde{C}_p}{\tilde{L}_p}} \quad (11)$$

Figure 2:
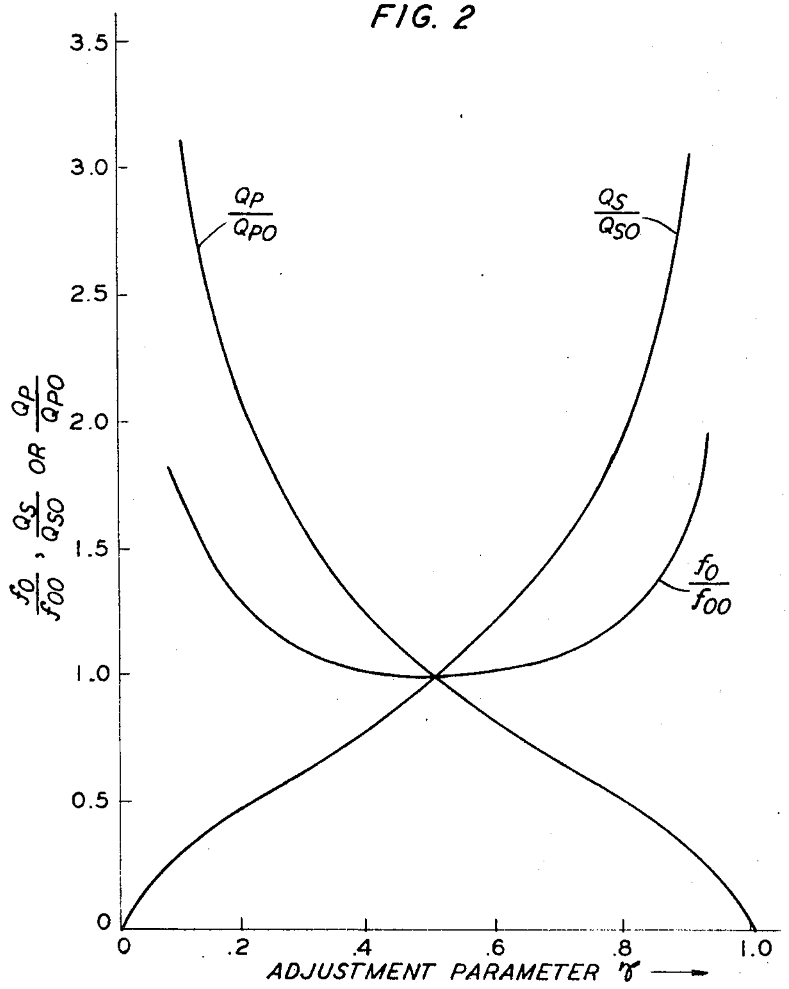
FIG. 2 illustrates graphically the variation in selectivity and tuning of both the series and shunt type resonators in accordance with the present invention.

The dependence of each of the ratios $f_o/f_{oo}$, $Q_s/Q_{so}$ and $Q_p/Q_{po}$ upon $\gamma$ is plotted in FIG. 2, and illustrates that as $\gamma$ is varied in either direction from its mid position ($\gamma=0.5$), a substantial variation in selectivity is obtained with only a very small deviation in frequency. Ideally, a selectivity ratio of 2 can be obtained with a frequency deviation of less than 7 percent.

The resonators illustrated in FIGS. 1A and 1B can be conveniently realized by the use of appropriately terminated lengths of TEM transmission line. As is known, lengths of low-loss transmission line that are terminated in an open or short circuit are the equivalent of reactive elements. Specifically, the input impedance of a transmission line that is less than a quarter of a wavelength long is inductive when short circuited, and capacitive when open circuited. Utilizing these properties, the series arrangement represented by FIG. 1A can be implemented in the manner shown in either FIGS. 3 or 4, while the parallel arrangement represented by FIG. 1B can be implemented in the manner shown in either FIGS. 5 or 6.

Figure 3:
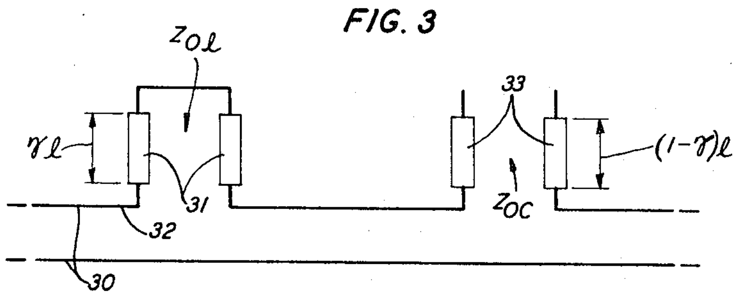
FIGS. 3, 4, 5 and 6 illustrate various adjustable resonators using lengths of transmission lines as variable capacitances and inductances.

In the arrangement illustrated in FIG. 3, the resonator inductance is provided by a short-circuited stub 31 located along one of the conductors 32 of a two-conductor transmission line 30. The resonator capacitance, located immediately adjacent to stub 31, is provided by means of an open-circuited stub 33.

As indicated above, a shorted section of line appears inductive for lengths less than a quarter wavelength, whereas an open-circuited section of line appears capacitive. Accordingly, each of the sections 31 and 33 should be less than a quarter of a wavelength over the range of operating frequencies. However, Equations 6, 7 and 8, and the curves shown in FIG. 2 are based upon the assumption that the total inductance and the total capacitance vary linearly as a function of the lengths $l_L(=\gamma l)$ and $l_C(=(1-\gamma)l)$ of the respective transmission lines 31 and 33. To more closely approximate this condition, the two stubs are preferably made much less than a quarter of a wavelength. Advantageously, $$l_L+l_C=l<\frac{\lambda}{8} \quad (12)$$

The magnitude of the reactance produced by each of a stub is also a function of its characteristic impedance. In particular, $\tilde{L}$ is proportional to $Z_{ol}$, the characteristic impedance of stub 31, and $\tilde{C}$ is inversely proportional to $Z_{oc}$, the characteristic impedance of stub 33. Thus, the resonator parameters are conveniently determined by the length and characteristic impedance of each stub.

Figure 4:
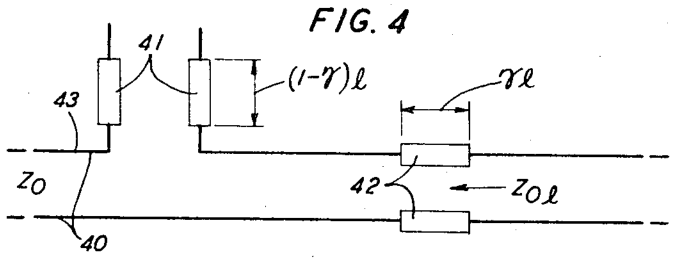

The arrangement of FIG. 4 is similar to that shown in FIG. 3 in that the resonator capacitance is provided by an open-circuited stub 41 located along one conductor 43 of a two conductor transmission line 40. The resonator inductance, however, comprises a transmission line stub 42 in series with line 40. By making the characteristic impedance $Z_{ol}$ of line 42 larger that the characteristic impedance $Z_o$ of line 40, and its length less than a quarter of a wavelength, line segment 42 is the equivalent of a series inductance. Advantageously $Z_{ol}$ is of the order of $10Z_o$ and for the reasons set forth above, each of the line segments 41 and 42 is advantageously smaller than an eighth of a wavelength.

Figure 5:
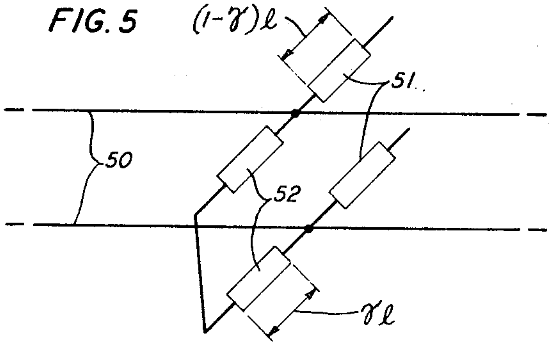
Figure 6:
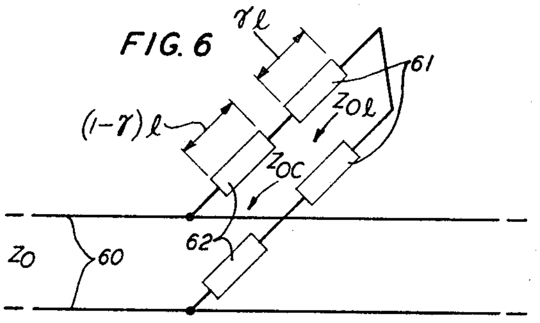

FIG. 5 shows a shunt arrangement wherein both the open-circuited (capacitive) stub 51 and the short-circuited (inductive) stub 52 are connected across (in shunt with) the two conductors of transmission line 50. FIG. 6 illustrates a slight modification of the shunt arrangement of FIG. 5 wherein the short-circuited (inductive) stub 61, and the open-circuited stub 62 are placed in series, and this series combination of stubs connected across the two conductors of transmission line 60.

In each instance the stubs are less than a quarter wavelength long and, advantageously, less than an eighth of a wavelength long at the highest frequency of interest. In addition, the characteristic impedance $Z_{ol}$ of the inductive stub is much larger than the impedance $Z_o$ of the transmission line, whereas the characteristic impedance $Z_{oc}$ of the capacitive stub is much less than $Z_o$.

Figure 7:
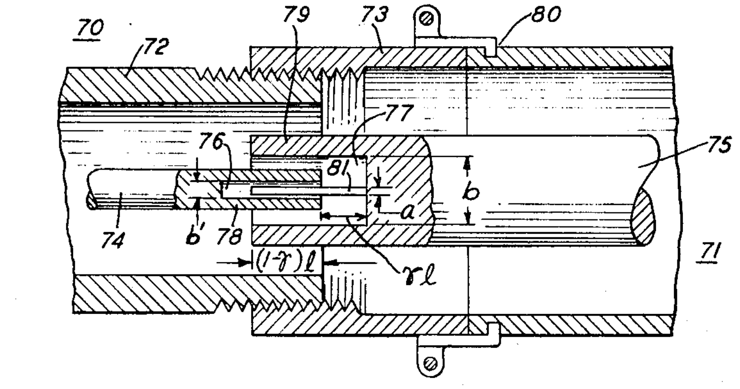
FIGS. 7, 8, 9 and 10 illustrate specific embodiments of the invention employing coaxial transmission line.

FIGURES 7, 8, 9 and 10, now to be described, illustrate four specific coaxial embodiments of the adjustable resonator circuits shown in FIGS. 3, 4, 5 and 6, respectively. The first of these embodiments, illustrated in FIG. 7, comprises a pair of series-connected coaxial transmission lines 70 and 71. The outer surface of outer conductor 72 of line 70, and the inner surface of outer conductor 73 of line 71 are threaded at their respective ends, and are conductively connected together by mutually engaging portions of these threaded regions. Means, such as the flange and groove arrangement 80 shown in FIG. 7, are provided to allow the threaded end of outer conductor 73 to rotate.

The center conductors 74 and 75 of the two transmission lines are colinearly aligned along a common longitudinal axis, and are adapted, at their respective ends, to form a variable series inductance and capacitance. Specifically, the end of conductor 74 includes a hollowed-out region 76, surrounded by a conductive circular cylinder 78 having an inside diameter $b'$.

The end of conductor 75 includes an annular recess 77, which surrounds an inner conductive post 81 of diameter $a$, and is, in turn, surrounded by outer conductive cylinder 79 of inside diameter $b$.

The ends of the two conductors 74 and 75 are partially overlapping such that post 81 of conductor 75 extends into the hollowed-out region 76 of conductor 74, and cylinder 78 extends into recess 77. Similarly, cylinder 79 surrounds and overlaps a portion of cylinder 78. As a consequence of this overlapping, three transmission line stubs are formed. The first of these is an open-circuited (capacitive) stub of length $(1-\gamma)l$, formed by the overlapping portions of cylinders 78 and 79. For purposes of the present invention, this stub constitutes a spurious capacitive coupling between the two transmission lines which slightly modifies the resonator characteristics. Advantageously, this coupling is made small.

The second transmission line stub thus formed is an open-circuited (capacitive) stub of length $(1-\gamma)l$ comprising the overlapping portions of cylinder 78 and post 81. This stub, which is the capacitive member of the adjustable resonator, is in series with conductors 74 and 75, and has a characteristic impedance given by $$Z_{oo}=\frac{60}{\sqrt{\epsilon}}\ln\left(\frac{b'}{a}\right)$$

where $\epsilon$ is the dielectric constant of the material between post 81 and cylinder 78. Typically, this material is air.

The third transmission line stub formed is a short-circuited (inductive) stub of length $\gamma l$ comprising the remaining portions of post 81 and cylinder 79. This stub, which is the inductive member of the adjustable resonator is also in series with conductors 74 and 75, and has a characteristic impedance given by $$Z_{o1}=\frac{60}{\sqrt{\epsilon}}\ln\left(\frac{b}{a}\right)$$

Thus, the embodiment of FIG. 7 is the equivalent of the circuit shown in FIG. 3 (with an added spurious capacitance in parallel with the resonator). The selectivity is varied by rotating the threaded end of conductor 73, thereby simultaneously varying the relative lengths of the capacitive and inductive stubs forming the adjustable resonator.

Figure 8:
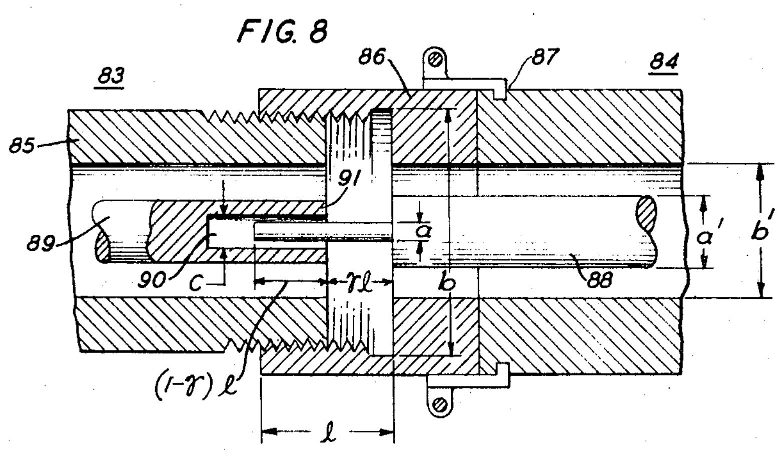

The embodiment of FIG. 8 similarly includes a pair of series-connected coaxial transmission lines 83 and 84, modified at their respective ends to produce the equivalent of the series capacitive stub 41 and the inductive length of transmission line 42, shown in FIG. 4. The latter is formed by increasing the characteristic impedance of line 84 over an interval that is less than a quarter of a wavelength long at the highest frequency of interest. In the embodiment of FIG. 8, this is done by abruptly increasing the inner diameter of outer conductor 86 of line 84 from $b'$ to $b$, equal to the outside diameter of outer conductor 85 of line 83, while, over the same interval $l$, decreasing the diameter of the inner conductor 88 of line 84 from $a'$ to $a$. The effect of these dimensional changes is to increase the characteristic impedance of line 84 over this interval of line from $$Z_o=\frac{60}{\sqrt{\epsilon}}\ln\frac{b'}{a'}\text{ to }Z_{o1}=\frac{60}{\sqrt{\epsilon}}\ln\left(\frac{b}{a}\right)$$

A capacitance in series with the inner conductors 89 and 88 of lines 83 and 84, respectively, is formed by inserting a portion of the reduced diameter inner conductor 88 into a hollowed-out region 90 at the end of conductor 89. The inserted portion of conductor 88, and the coextensive portion of cylinder 91, surrounding region 90, form an open-circuited (capacitive) stub of length $(1-\gamma)l$ and characteristic impedance $$Z_{oo}=\frac{60}{\sqrt{\epsilon}}\ln\left(\frac{c}{a}\right)$$

where $c$ is the inside diameter of cylinder 91. Over the remaining portion $\gamma l$, of interval $l$, conductor 88 and outer conductor 86 form an inductance in series with transmission lines 83 and 84.

As in the embodiment of FIG. 7, the outer surface of outer conductor 85 of line 83, and the inner surface of outer conductor 86 of line 84 are threaded at their respective ends, and conductively connected together by mutually engaging portions of these threaded regions. Means, such as flange and groove arrangement 87, are provided to allow the threaded end of outer conductor 86 to rotate, thereby simultaneously varying the relative lengths of the capacitive stub and inductive length of line forming the adjustable resonator.

Figure 9:
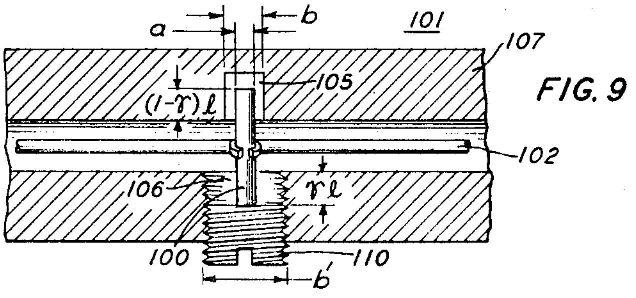
Figure 10:
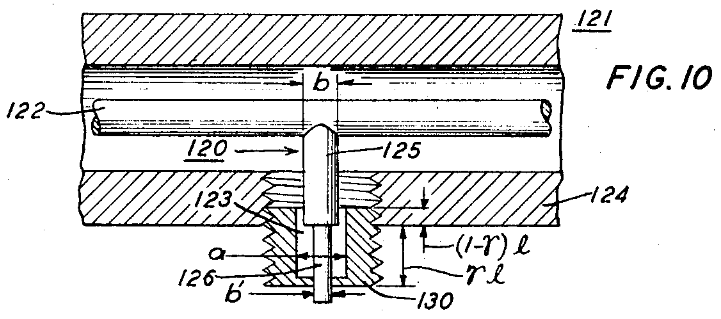

The remaining two embodiments, shown in FIGS. 9 and 10, illustrated the variable shunt resonator arrangements depicted symbolically in FIGS. 5 and 6, respectively. In the embodiment of FIG. 9, the variable shunt capacitance and variable shunt inductance are produced by means of a slidable conductive member 100 which extends transversely across coaxial transmission line 101. Member 100 slidably contacts the inner conductor 102 of line 101, and extends into oppositely located recesses 105 and 106 in the outer conductor 107 of the line.

The upper portion of member 100, extending into recess 105, forms an open-circuited (capacitive) stub of length $(1-\gamma)l$ and characteristic impedance $$Z_{oo}=\frac{60}{\sqrt{\epsilon}}\ln\left(\frac{b}{a}\right)$$

where
$a$ is the diameter of member 100, and
$b$ is the diameter of recess 105.

The lower portion of member 100 extends into recess 106 and is conductively terminated in a short circuit by a conductive plug 110, forming a short-circuited (inductive) stub of length $\gamma l$ and characteristic impedance $$Z_{o1}=\frac{60}{\sqrt{\epsilon}}\ln\left(\frac{b'}{a}\right)$$

where $b'$ is the diameter of recess 106.

The relative lengths of the two stubs thus formed are varied by threading plug 110 in or out.

In the embodiment of FIG. 10 the shunt capacitive and inductive stubs are formed in series by means of a shunt-connected conductive member 120 which extends transversely across coaxial cable 121 between inner conductor 122 and outer conductor 124.

Member 120, which is conductively connected to inner conductor 122, includes a first section 125 of diameter $b$, and a second section 126 of diameter $b'$, less than $b$. Portions of each of these sections extend into a recess 123, of diameter $a$, in a threaded shorting plug 130 which makes slidable contact with section 126. The plug is threaded into outer conductor 124, and thereby conductively terminates section 126 at the point along its length with which it is contact. The portion of section 126 beyond the short extends out of transmission line 121 through an aperture in the end of the plug.

The portion of section 125 coextensive with a portion of plug 130 forms an open-circuited (capacitive) stub of length $(1-\gamma)l$, and characteristic impedance $$Z_{oo}=\frac{60}{\sqrt{\epsilon}}\ln\left(\frac{a}{b}\right)$$

in shunt with line 121. The portion of section 126 between sections 125 and the point at which plug 130 shorts section 126 form a short-circuited (inductive) stub of length $\gamma l$ and characteristic impedance $$Z_{o1}=\frac{60}{\sqrt{\epsilon}}\ln\left(\frac{a}{b'}\right)$$

in series with the capactive stub.

Threading plug 130 in or out simultaneously changes the relative lengths of the two stubs, thereby changing the selectivity of the resonator.

In all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An adjustable filter comprising:
a two-conductor transmission line;
a first transmission line stub connected to said line forming an inductance;
a second transmission line stub connected to said line forming a capacitance;
said inductance and capacitance defining a bandpass filter having a prescribed center frequency and selectivity;
and means for simultaneously increasing the length of one of said stubs while decreasing the length of the other of said stubs thereby varying the selectivity of said filter while maintaining said center frequency substantially constant.

2. The filter according to claim 1 wherein said capacitance and said inductance are in series with said transmission line.

3. The filter according to claim 1 wherein said capacitance and said inductance are connected in shunt across said transmission line.

4. The filter according to claim 1 wherein the characteristic impedance of said first transmission line stub is larger than the characteristic impedance of said transmission line;

and wherein the characteristic impedance of said second transmission line stub is less than the characteristic impedance of said transmision line.

5. The filter according to claim 1 wherein each of said stubs is less than an eighth of a wavelength long at the highest frequency of interest.

6. The filter according to claim 1 wherein:

said transmission line includes first and second sections of coaxial transmission line, each section having an inner conductor and a surrounding outer conductor;

the end of the inner conductor of said first section of line including a hollowed-out region surrounded by a conductive circular cylinder;

the end of the inner conductor of said second section of line including an annular recess bounded by an inner conductive post and an outer conductive circular cylinder;

the ends of said inner conductors being partially overlapping with said conductive post extending partially into said hollowed-out region, and the circular cylinder of said first section of line extending partially into said annular recess;

the outer conductors of said sections of line being conductively connected together, and including means for changing the extent of said overlapping.

7. The filter according to claim 1 wherein:

said transmission line include first and second sections of coaxial transmission line, each section having an inner conductor and a surrounding outer conductor;

the end of the inner conductor of said first section of line including a hollowed-out region;

the end of said second section of line including a region less than a quarter wavelength long having a higher characteristic impedance than the rest of said second section of line;

the ends of said sections of line partially overlapping, with the inner conductor of said second section of line extending partially into said hollowed-out region;

the outer conductors of said sections of line being conductively connected together, and including means for changing the extent of said overlapping.

8. The filter according to claim 1 wherein:

said transmission line is a coaxial line having an inner and an outer conductor;

and wherein said inductance and said capacitance are formed by a conductive post extending transversely across said line;

said post being in slidable contact with said inner conductor along its length, and partially extending at its ends into recesses in opposite sides of said outer conductor;

one of the ends, being conductively insulated from said outer conductor, forming an open-circuited capacitive stub in shunt with said line;

the other end, being conductively connected to said outer conductor by means of a plug, forming a short-circuited inductive stub in shunt with said line;

said plug being adapted to move said post in a direction transverse to said line thereby simultaneously changing the lengths of said capacitive and inductive stubs.

9. A filter according to claim 1 wherein:

said transmission line is a coaxial line having an inner and an outer conductor;

and wherein said inductance and said capacitance are formed by a conductive post extending transversely across said line from said inner conductor into an aperture in said outer conductor;

said post having two regions of different diameter with the first of said regions immediately adjacent to said inner conductor being larger than the second of said regions;

a hollow conductive plug, having an end thereof in slidable contact with the second region of said post, disposed within said aperture with the side thereof in conductive contact with said outer conductor;

said side extending inward toward said inner conductor coextensive with a portion of the first region of said post;

said plug adapted to move in a direction parallel to said post thereby changing the location of said contact with said second region of said post and, simultaneouly, varying the length of the portion of said first region coextensive with the side of said plug.

References Cited

UNITED STATES PATENTS

| | | | |
|---|---|---|---|
| 3,087,128 | 4/1963 | Frigyes et al. ______ | 334—40 X |
| 3,264,584 | 8/1966 | Edwards ____________ | 333—33 |

HERMAN K. SAALBACH, *Primary Examiner.*

T. J. VEZEAU, *Assistant Examiner.*

U.S. Cl. X.R.

334—40